United States Patent
Iwanaga et al.

(10) Patent No.: US 12,117,091 B2
(45) Date of Patent: Oct. 15, 2024

(54) SOLENOID VALVE

(71) Applicant: Eagle Industry Co., Ltd., Tokyo (JP)

(72) Inventors: Hiroyuki Iwanaga, Tokyo (JP); Yoshinari Kasagi, Tokyo (JP); Kenta Furukawa, Tokyo (JP)

(73) Assignee: EAGLE INDUSTRY CO., LTD. (JP)

(*) Notice: Subject to any disclaimer, the term of this patent is extended or adjusted under 35 U.S.C. 154(b) by 91 days.

(21) Appl. No.: 17/918,311

(22) PCT Filed: Mar. 31, 2021

(86) PCT No.: PCT/JP2021/013996
§ 371 (c)(1),
(2) Date: Oct. 11, 2022

(87) PCT Pub. No.: WO2021/210405
PCT Pub. Date: Oct. 21, 2021

(65) Prior Publication Data
US 2023/0151903 A1    May 18, 2023

(30) Foreign Application Priority Data

Apr. 14, 2020  (JP) .................................. 2020-072401

(51) Int. Cl.
*F16K 31/06*    (2006.01)
*F16K 47/00*    (2006.01)

(52) U.S. Cl.
CPC .......... *F16K 31/06* (2013.01); *F16K 31/0613* (2013.01); *F16K 31/0689* (2013.01);
(Continued)

(58) Field of Classification Search
None
See application file for complete search history.

(56) References Cited

U.S. PATENT DOCUMENTS 7,748,408 B2 *  7/2010  Voss ..................... F16K 27/041
                                              137/625.69
8,006,718 B2 *  8/2011  Hamaoka ............ F16K 31/0613
                                              137/315.27
(Continued)

FOREIGN PATENT DOCUMENTS

JP    2004278607    10/2004    ............. F16K 31/06
JP    2005188630    7/2005     ............. F16K 31/06
(Continued)

OTHER PUBLICATIONS

International Preliminary Report on Patentability issued in PCT/JP2021/013996, dated Oct. 27, 2022, with English translation, 5 pages.
(Continued)

*Primary Examiner* — Matthew W Jellett
(74) *Attorney, Agent, or Firm* — HAYES SOLOWAY P.C.

(57) ABSTRACT

A solenoid valve in which a plunger is disposed in an accommodation space inside a solenoid unit, includes: a first breathing flow passage extending in a circumferential direction on an outer periphery of a stator to communicate with an outside of the solenoid valve; a second breathing flow passage extending from the first breathing flow passage in an axial direction at a part in the circumferential direction to communicate with a first space formed between the stator, a sleeve, and a spool; and a third breathing flow passage extending in the axial direction on an inner periphery of the stator to allow communication between the first space and a second space.

7 Claims, 8 Drawing Sheets

(52) U.S. Cl.
CPC ...... *F16K 31/0693* (2013.01); *F16K 47/0111*
(2021.08); *F16K 31/0606* (2013.01); *F16K 2200/30* (2021.08)

(56) References Cited

U.S. PATENT DOCUMENTS

| | | | | |
|---|---|---|---|---|
| 8,931,758 | B2* | 1/2015 | Kasagi | ................ F16K 31/0613 |
| | | | | 251/129.15 |
| 9,068,577 | B2* | 6/2015 | Kasagi | ................ F15B 13/0401 |
| 2012/0199771 | A1 | 9/2012 | Kasagi et al. | ........... 251/129.15 |
| 2020/0332910 | A1 | 10/2020 | Furukawa et al. | .. F16K 31/0613 |

FOREIGN PATENT DOCUMENTS

| | | | | |
|---|---|---|---|---|
| JP | 2010151165 | | 7/2010 | ............ F16K 31/06 |
| JP | 2019065929 | | 4/2019 | ............ F16K 31/06 |
| JP | 2019157901 | | 9/2019 | ............ F16K 31/06 |
| WO | 2011052371 | | 5/2011 | ............ F16K 31/06 |
| WO | 2019102931 | | 5/2019 | ............ F16K 31/06 |

OTHER PUBLICATIONS

International Search Report and Written Opinion issued in PCT/JP2021/013996, dated Jun. 22, 2021, with English translation, 11 pages.

European Search Report dated Mar. 22, 2024, issued in application No. 21787950.1, 8 pages.

* cited by examiner

SOLENOID VALVE

TECHNICAL FIELD

The present invention relates to a solenoid valve, particularly, to a solenoid valve suitable for hydraulic control of a hydraulic circuit.

BACKGROUND ART

A solenoid valve for hydraulic control in the related art includes a valve unit including a sleeve, a spool that is accommodated in the sleeve so as to be movable in an axial direction, a spring that biases the spool in the axial direction, and a retainer attached to an end portion of the sleeve to hold the spring; and a solenoid unit including a plunger that drives the spool in the axial direction, a stator, a solenoid molded body which is disposed on an outer periphery of the plunger and in which a coil and the like are covered with resin, and a solenoid casing that accommodates these components. The solenoid valve is disposed between a pressure source such a pump or an accumulator and a supply destination to be able to supply a fluid of which the pressure or the flow rate is adjusted by the movement of the spool, to the supply destination.

By the way, since the movement stroke of the spool inside the sleeve is relatively large, when the spool is driven in the axial direction, the fluid in an accommodation space where the plunger is accommodated in the solenoid unit becomes resistance to interfere with rapid movement of the plunger, which is a problem.

In a solenoid valve disclosed in Patent Citation 1, a breathing hole is formed in a sleeve to penetrate therethrough in a radial direction, and a fluid is moved between an accommodation space and the outside of the solenoid valve via the breathing hole, namely, so-called breathing is performed, so that resistance of the fluid involved by the movement of a plunger is reduced and responsiveness of the solenoid valve is improved.

CITATION LIST

Patent Literature

Patent Citation 1: WO 2011/052371 A (PAGE 7 and FIG. 1)

SUMMARY OF INVENTION

Technical Problem

In such a solenoid valve, the fluid is moved between the accommodation space and the outside of the solenoid valve through the breathing hole formed in the sleeve, by the movement of the plunger to drive a spool in an axial direction, so that resistance of the fluid involved by the movement of the plunger is reduced. However, in the solenoid valve of Patent Citation 1, since the breathing hole formed in the sleeve penetrates therethrough in the radial direction to communicate with an outer peripheral space of the spool, the spool is easily subjected to the flow, the pressure, or the like of the fluid when the fluid flows in, and the spool is inclined with respect to the sleeve, so that slidability is decreased and responsiveness of the solenoid valve is impaired, which is a problem.

The present invention is conceived in view of such problems, and an object of the present invention is to provide a solenoid valve in which responsiveness of the solenoid valve can be improved.

Solution to Problem

In order to solve the foregoing problems, according to the present invention, there is provided a solenoid valve including: a valve unit including a sleeve in which a spool is accommodated so as to be movable in an axial direction; and a solenoid unit including a plunger to be brought into contact with and separated from a stator by an electromagnetic force to drive the spool in the axial direction, a solenoid molded body disposed on an outer periphery of the plunger and of the stator, and a solenoid casing that accommodates the solenoid molded body. The plunger is disposed in an accommodation space of which at least a part is defined by the stator inside the solenoid unit. The solenoid valve further includes a first breathing flow passage extending at least in a circumferential direction on the outer periphery of the stator to communicate with an outside of the solenoid valve, a second breathing flow passage extending in the axial direction from part of the first breathing flow passage in the circumferential direction to communicate with a first space defined by the stator, the sleeve, and the spool, and a third breathing flow passage extending in the axial direction on an inner periphery of the stator to allow communication between the first space and the accommodation space. According to the aforesaid feature of the present invention, when a fluid is moved through a breathing passage from the outside of the solenoid valve to the inside by the movement of the plunger, the fluid flows out from the first breathing flow passage into the first space through the second breathing flow passage extending in the axial direction at a part in the circumferential direction, on the outer periphery of the stator, so that the fluid which has moved through the second breathing flow passage in the axial direction is dispersed in the first space and the flow of the fluid is weakened. Accordingly, the influence of the fluid in a radial direction is decreased, so that the spool can be held coaxially with the sleeve, smooth slidability of the spool with respect to the sleeve can be maintained, and responsiveness of the solenoid valve can be improved. In addition, since the breathing passage can be made long by the first breathing flow passage and the second breathing flow passage, it is difficult for a contamination existing outside the solenoid valve to infiltrate into the accommodation space.

It may be preferable that the first breathing flow passage is be formed in an annular shape, and communicates with the outside of the solenoid valve through an axial communication passage extending in the axial direction toward an opening formed in the solenoid casing or in the sleeve. According to this preferable configuration, since the breathing passage can be made long by the first breathing flow passage and the axial communication passage, it is difficult for the contamination existing outside the solenoid valve to infiltrate into the accommodation space.

It may be preferable that the second breathing flow passage communicates with the first space on a radially outer side with respect to the spool. According to this preferable configuration, the fluid that moves through the second breathing flow passage in the axial direction to flow out into the first space acts an axial force mainly on the sleeve, so that it is difficult for the fluid to affect the operation of the spool.

It may be preferable that the second breathing flow passage faces the axial communication passage in a radial direction. According to this preferable configuration, it is difficult for the contamination that has infiltrated into the first breathing flow passage from the outside of the solenoid valve through the axial communication passage to infiltrate into the second breathing flow passage.

It may be preferable that the axial communication passage is formed on a vertically lower side on the outer periphery of the stator in case the plunger is moved in a horizontal direction. According this preferable configuration, the fluid existing outside the solenoid valve easily flows into the first breathing flow passage through the axial communication passage, and the contamination that has infiltrated into the first breathing flow passage, together with the fluid, descend due to their own weight, so that the contamination can be easily discharged to the outside via the axial communication passage.

It may be preferable that a radial groove communicating with the second breathing flow passage and with the third breathing flow passage is formed in the stator or in the spool. According to this preferable configuration, regardless of the axial position of the spool, the second breathing flow passage and the third breathing flow passage always communicate with each other through the radial groove to prevent interference with the movement of the fluid in the breathing passage, so that resistance of the fluid involved by the movement of the plunger can be reduced.

BRIEF DESCRIPTION OF DRAWINGS

FIG. 6 illustrates a mode where the fluid moves from the inside of the solenoid valve to the outside.

FIG. 7 illustrates a mode where the fluid moves from the outside of the solenoid valve to the inside.

DESCRIPTION OF EMBODIMENTS

A mode for carrying out a solenoid valve according to the present invention will be described below based on an embodiment.

Embodiment

Figure 2:
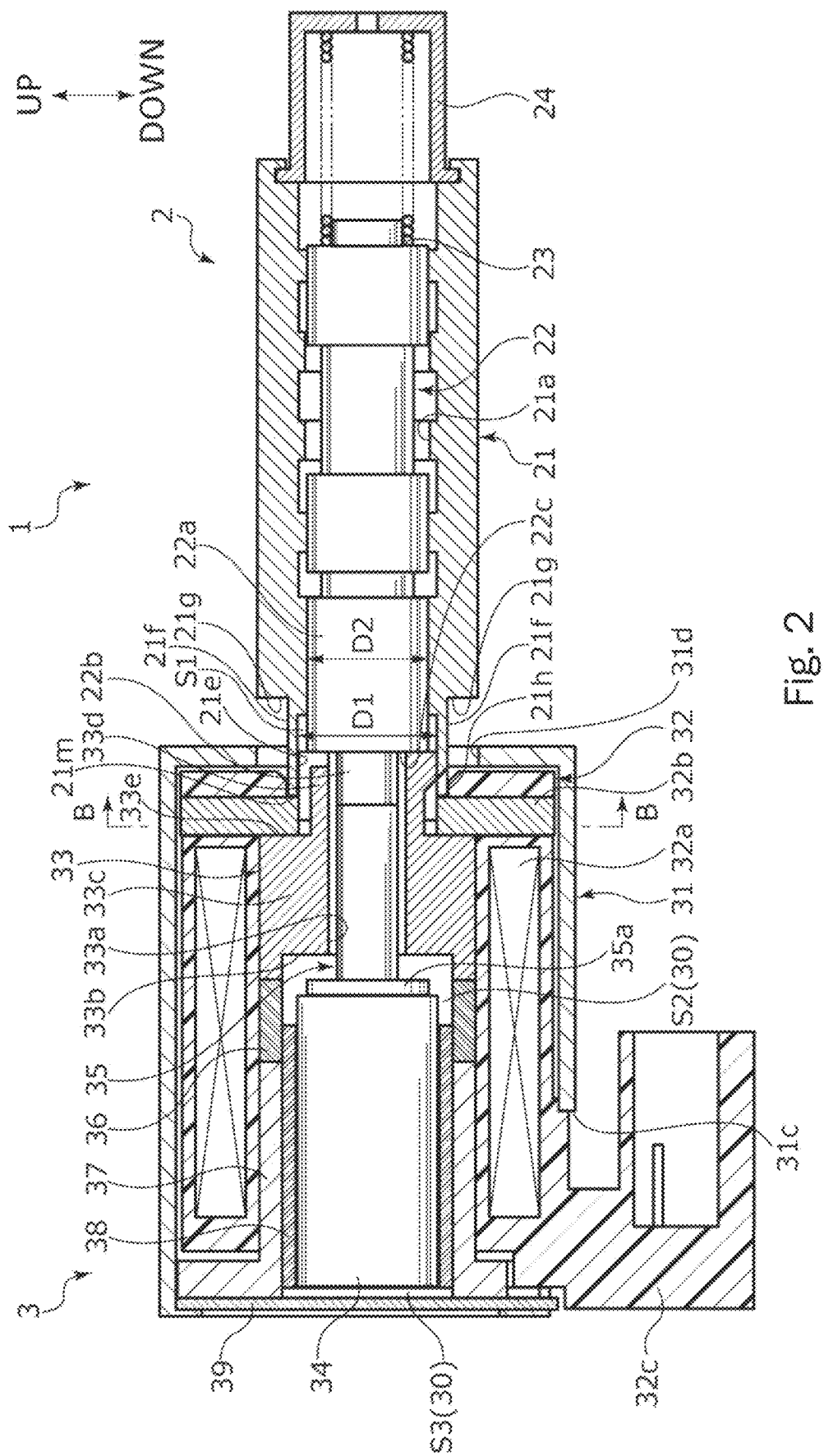
FIG. 2 is a cross-sectional view illustrating an off state of the solenoid valve of the embodiment taken along line A-A of FIG. 1.
Figure 3:
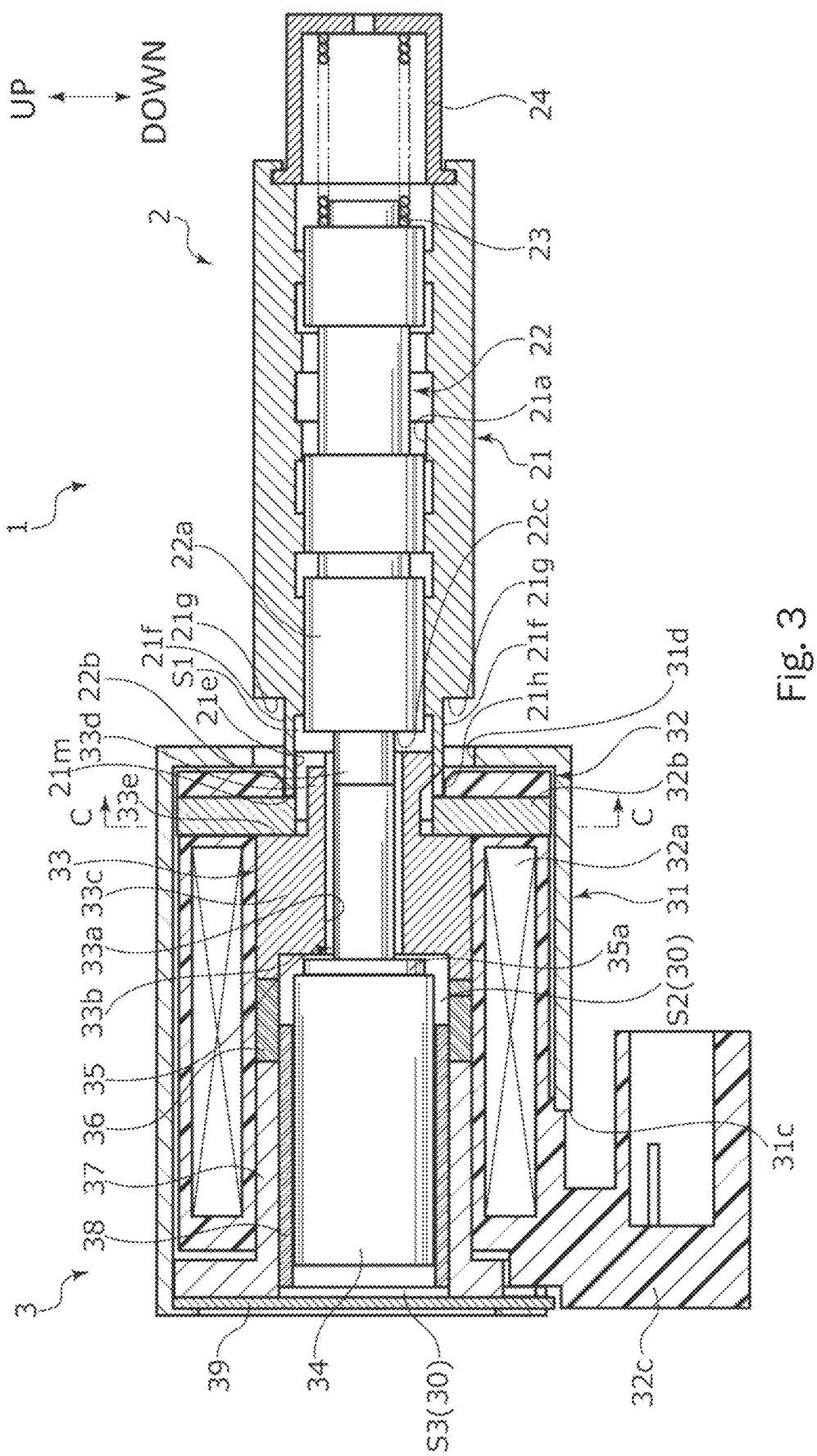
FIG. 3 is a cross-sectional view illustrating an on state of the solenoid valve of the embodiment taken along line A-A of FIG. 1.

A solenoid valve according to an embodiment of the present invention will be described with reference to FIGS. 1 to 8. Hereinafter, a description will be given based on the assumption that left and right sides when seen from the front side of FIGS. 2 and 3 are left and right sides of the solenoid valve. Incidentally, for convenience of description, a spool 22, a plunger 34, and a rod 35 illustrated in FIGS. 2, 3, 6, and 7 are illustrated not in cross-sectional views but in side views.

A solenoid valve 1 is a spool type solenoid valve, and is used in, for example, a hydraulically controlled apparatus such as an automatic transmission of a vehicle to control the pressure or the flow rate of a control fluid such as a hydraulic oil (hereinafter, simply referred to as a "fluid") in a fluid circuit.

Figure 1:
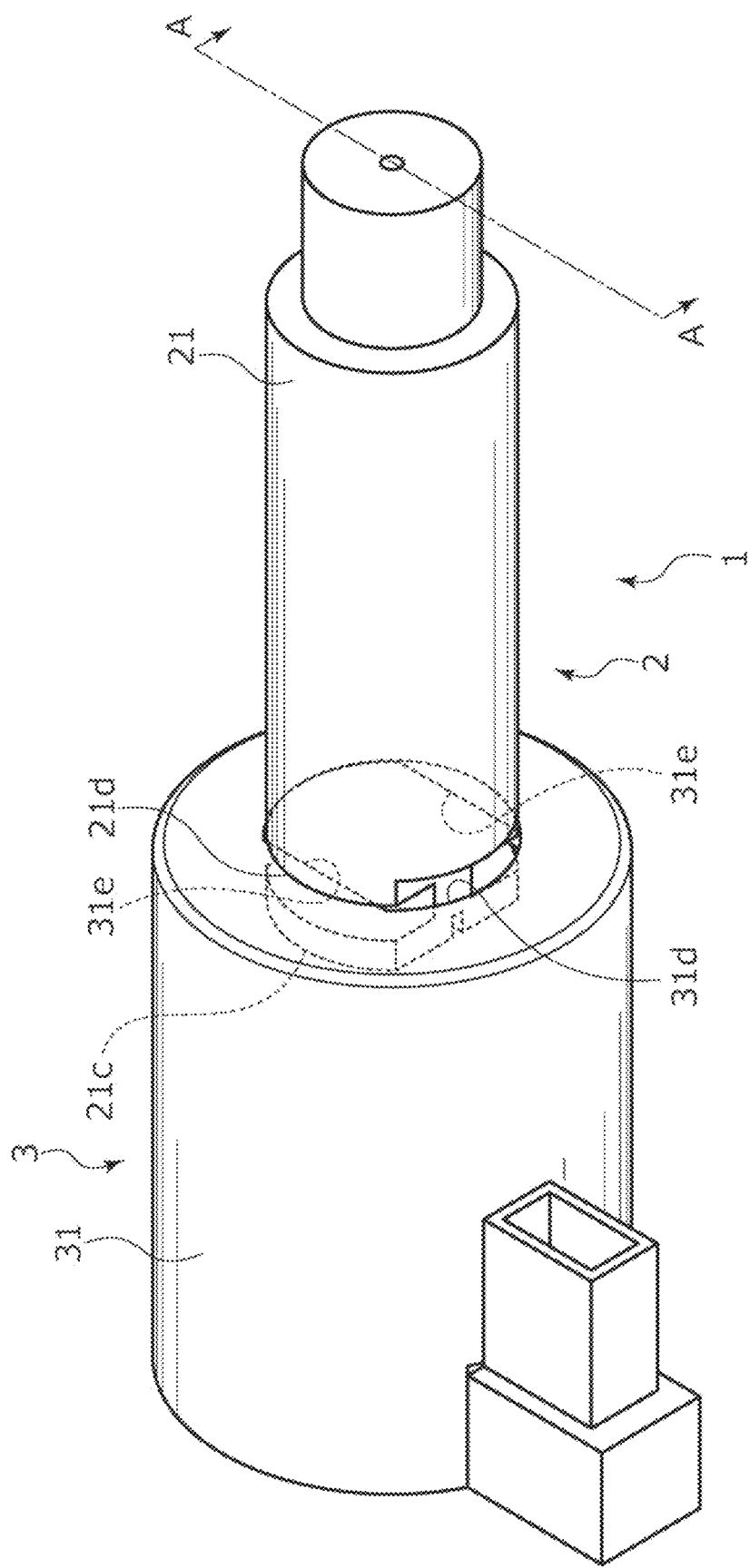
FIG. 1 is a perspective view illustrating a solenoid valve according to an embodiment of the present invention.

As illustrated in FIG. 1, the solenoid valve 1 is configured such that a valve unit 2 which adjusts the pressure or the flow rate of the fluid as a valve is integrally attached to a solenoid unit 3. Incidentally, the attachment of the valve unit 2 to the solenoid unit 3 will be described in detail at a later stage.

As illustrated in FIGS. 2 and 3, the valve unit 2 includes a sleeve 21 having a substantially cylindrical shape; the spool 22 having a substantially columnar shape that is liquid-tightly accommodated in a through-hole 21a of the sleeve 21 to be movable in an axial direction; a spring 23 having a coil shape that is attached to an axially right end portion of the spool 22 to bias the spool 22 leftward in the axial direction; and a retainer 24 that is caulked and fixed to an axially right end portion of the sleeve 21 to hold the spring 23. Incidentally, since this configuration is a well-known configuration of a spool valve, a detailed description thereof will be omitted. In addition, the sleeve 21, the spool 22, and the retainer 24 are made of a material such as aluminum, iron, stainless steel, or resin.

Figure 4:
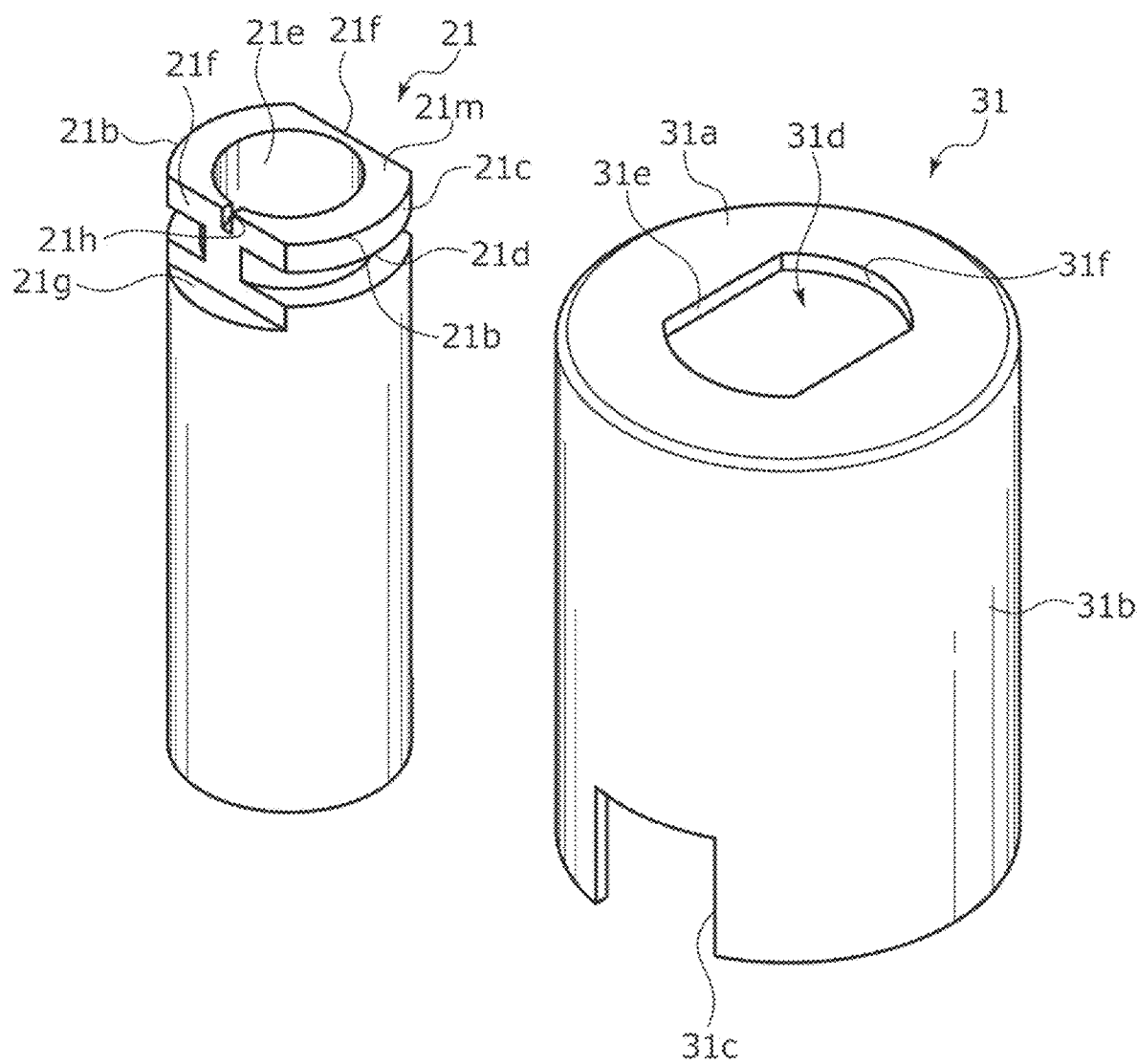
FIG. 4 is a perspective view illustrating a structure of a sleeve and a solenoid casing in the embodiment.

As illustrated in FIGS. 2 and 3, a pair of axial cut surfaces 21f and 21f formed along the axial direction and a pair of radial cut surfaces 21g and 21g formed along a radial direction are formed on both upper and lower sides at an axially left end portion of the sleeve 21. Namely, as illustrated in FIG. 4, the axial cut surfaces 21f and 21f form a pair of linear portions when seen in the axial direction, and portions that extend radially outward between the pair of axial cut surfaces 21f and 21f and in which arc shapes remain form a pair of arc portions 21b and 21b, so that the axially left end portion of the sleeve 21 is formed in a stadium shape. Incidentally, for convenience of description, FIG. 4 illustrates a state where the axially left end portion of the sleeve 21 faces upward on the drawing sheet.

In addition, a slit 21d extending in a circumferential direction is formed at the axially left end portion of the sleeve 21 at a location distant from an end surface 21m having a stadium shape in the axial direction, so that a flange portion 21c is formed between the end surface 21m and the slit 21d. Incidentally, since the slit 21d is formed, each of the axial cut surfaces 21f and 21f is formed in a substantially H shape.

In addition, a cutout 21h as an opening extending from the end surface 21m in the axial direction is formed in the axial cut surface 21f that is disposed on a vertically lower side in a state where the valve unit 2 is attached to the solenoid unit 3 (refer to FIGS. 2 and 3). Incidentally, the cutout 21h has a tapered surface 21k that is inclined leftward from a radially outer side toward a radially inner side in the axial direction (refer to FIGS. 6 and 7).

In addition, a recessed portion 21e that is recessed rightward from a radially inner side of the end surface 21m in the axial direction is formed at the axially left end portion of the sleeve 21. Incidentally, an inner diameter D1 of the recessed portion 21e is set to be larger than an inner diameter D2 of the through-hole 21a at a portion that is in sliding contact with a land portion 22a of the spool 22 (D1>D2, refer to FIG. 2).

As illustrated in FIGS. 2 and 3, a protrusion portion 22b having a small diameter that protrudes leftward from a radially inner side of the land portion 22a in the axial direction to be inserted into a through-hole 33a of a stator 33 to be described later is formed at an axially left end portion of the spool 22. An end surface of the protrusion portion 22b, namely, an axially left end surface of the spool 22 is in contact with an axially right end surface of the rod 35 disposed in the through-hole 33a of the stator 33.

In addition, an outer peripheral surface of the protrusion portion 22b, an axially left end surface of the land portion 22a, and an outer peripheral surface of the land portion 22a form a step portion 22c having an annular shape at the axially left end portion of the spool 22. The step portion 22c is capable of coming into contact with and separating from an end surface of a protrusion portion 33d of the stator 33 to be described later.

As illustrated in FIGS. 2 and 3, the solenoid unit 3 mainly includes a solenoid casing 31 made of a metallic material such as iron having a magnetic property; a solenoid molded body 32 accommodated in the solenoid casing 31; the stator 33 disposed inside the solenoid molded body 32; and the plunger 34 disposed in an accommodation space 30 formed on an axially left side of the stator 33, so as to be movable in the axial direction.

As illustrated in FIG. 4, the solenoid casing 31 has a cup shape including a plate portion 31a having a disk shape and a cylindrical portion 31b, and an opening 31d having a stadium shape is formed at a center of the plate portion 31a, the opening 31d having a slightly larger outer shape than the axially left end portion of the sleeve 21, and including linear portions 31e and an arc portion 31f. Incidentally, for convenience of description, FIG. 4 illustrates a state where an axially right end portion of the solenoid casing 31 faces upward on the drawing sheet.

In addition, an end plate 39 is caulked and fixed to an axially left end portion of the cylindrical portion 31b of the solenoid casing 31 (refer to FIGS. 2 and 3). In addition, a cutout 31c into which a connector portion 32c (refer to FIGS. 2 and 3) of the solenoid molded body 32 is inserted is formed at the axially left end portion of the cylindrical portion 31b.

Regarding the attachment of the valve unit 2 to the solenoid unit 3, the sleeve 21 and the solenoid casing 31 are retained together in a state where the linear portions 31e and 31e of the opening 31d are interposed in the slit 21d, by inserting the flange portion 21c of the sleeve 21 into the opening 31d of the solenoid casing 31 and by rotating the sleeve 21 around an axis by 90 degrees at a position where the slit 21d corresponds to the opening 31d (refer to FIG. 1).

As illustrated in FIGS. 2 and 3, the solenoid molded body 32 is formed by molding a coil 32a, a lower plate 32b having an annular shape, and the like with resin, and a control current is supplied to the coil 32a from a connector of the connector portion 32c extending from the cutout 31c of the solenoid casing 31 (refer to FIG. 4) to the outside.

As illustrated in FIGS. 2 and 3, the plunger 34 is formed in a columnar shape from a metallic material such as iron having a magnetic property, and is disposed in the accommodation space 30 formed on the axially left side of the stator 33, so as to be movable in the axial direction.

Incidentally, a first tubular body 36 made of a non-magnetic material is disposed on the axially left side of the stator 33, a second tubular body 37 with a flange that is made of a magnetic material is disposed on an axially left side of the first tubular body 36, and a third tubular body 38 made of a magnetic material is disposed over the first tubular body 36 and the second tubular body 37 inside the first tubular body 36 and the second tubular body 37. Namely, the accommodation space 30 is defined by a recessed portion 33b of the stator 33 to be described later, inner peripheral surfaces of the first tubular body 36, of the second tubular body 37, and of the third tubular body 38, and an axially right end surface of the end plate 39.

In addition, the plunger 34 is disposed in the accommodation space 30 so as to be in slidable contact with the inner peripheral surface of the third tubular body 38 subjected to low friction processing. Incidentally, an outer peripheral surface of the plunger 34 and the inner peripheral surface of the third tubular body 38 are slightly separated from each other, but almost no fluid passes through this gap.

Namely, the plunger 34 is disposed to partition the accommodation space 30 into a second space S2 and a third space S3 in a substantially sealed state, the second space S2 being formed on an axially right side of the plunger 34 and the third space S3 being formed on the axially left side of the plunger 34. Incidentally, the third space S3 communicates with the outside of the solenoid valve 1 via a gap formed between an axially left end surface of the second tubular body 37 and the axially right end surface of the end plate 39 and via the cutout 31c of the solenoid casing 31 (refer to FIG. 4).

As illustrated in FIGS. 2 and 3, the rod 35 is made of a non-magnetic material such as resin or rubber, and a flange portion 35a extending radially outward is formed at an axially left end portion of the rod 35. Incidentally, the rod 35 is fixed in a state where an axially left end surface of the flange portion 35a is in contact with an axially right end surface of the plunger 34.

In addition, when the coil 32a is energized to generate an electromagnetic force between the stator 33 and the plunger 34 and thus to move the plunger 34 and the rod 35 rightward toward the stator 33 in the axial direction, an axially right end surface of the flange portion 35a of the rod 35 made of a non-magnetic material is capable of coming into contact with a bottom surface of the recessed portion 33b of the stator 33, so that the plunger 34 is prevented from being stuck to the stator 33.

Figure 5:
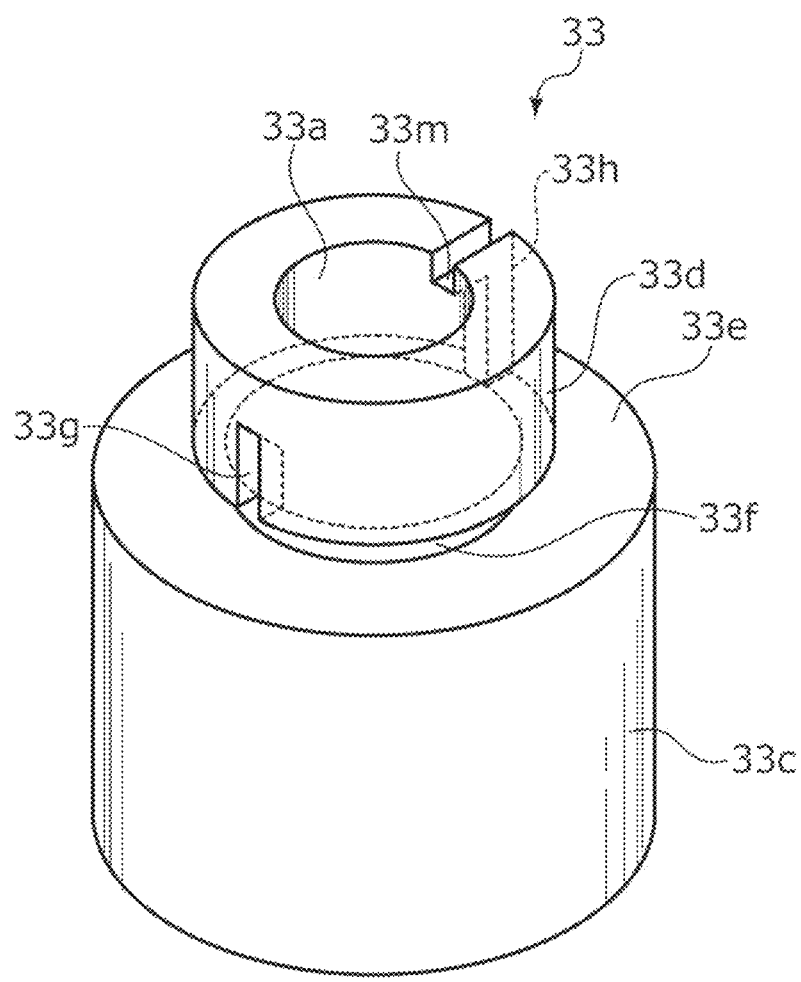
FIG. 5 is a perspective view illustrating a structure of a stator in the embodiment.

As illustrated in FIGS. 2, 3, and 5, the stator 33 is a tubular body having the through-hole 33a at a center portion thereof, the through-hole 33a penetrating therethrough in the axial direction, and is made of a metallic material such as iron having a magnetic property. In addition, the recessed portion 33b (refer to FIGS. 2 and 3) that is recessed rightward in the axial direction from a radially inner side of an axially left end surface of a base portion 33c is formed at an axially left end portion of the stator 33, and the recessed portion 33b communicates with the through-hole 33a.

In addition, the stator 33 includes the protrusion portion 33d having a small diameter that protrudes rightward in the axial direction from a radially inner side of an axially right end surface of the base portion 33c. The protrusion portion 33d is fitted into the lower plate 32b having an annular shape and forming the solenoid molded body 32, and into the recessed portion 21e of the sleeve 21. Incidentally, a step portion 33e having an annular shape is formed at an axially right end portion of the stator 33 by an outer peripheral surface of the protrusion portion 33d and the axially right end surface and an outer peripheral surface of the base portion 33c.

When the protrusion portion 33d is fitted into the lower plate 32b and into the recessed portion 21e of the sleeve 21, the step portion 33e comes into contact with an axially left end surface of the lower plate 32b in the axial direction to define the degree of insertion of the protrusion portion 33d into the recessed portion 21e of the sleeve 21. Accordingly, an end surface of the protrusion portion 33d, namely, an axially right end surface of the stator 33 and a bottom surface of the recessed portion 21e of the sleeve 21 are separated from each other in the axial direction, and a first space S1 having an annular shape is formed on an axial side opposite to the second space S2 in the accommodation space 30 formed on the axially left side of the stator 33, namely, on an axially right side of the stator 33. Incidentally, the first space S1 is defined by an axially right end surface of the protrusion portion 33d, an inner peripheral surface and the bottom surface of the recessed portion 21e of the sleeve 21, and an outer peripheral surface of the spool 22. As described above, the axially left end portion of the spool 22 is housed in the first space S1.

The first space S1 is changed in volume according to the axial position of the spool 22. In detail, the step portion 22c of the spool 22 is in contact with the end surface of the protrusion portion 33d of the stator 33 in an off state of the solenoid valve 1 (refer to FIG. 2), so that the first space S1 is formed only on a radially outer side of the land portion 22a, has an annular shape, and has a minimum volume. In addition, when the coil 32a is energized to drive the spool 22 rightward in the axial direction, the step portion 22c is separated rightward from the end surface of the protrusion portion 33d of the stator 33 in the axial direction, so that in addition to being formed on the radially outer side of the land portion 22a, the first space S1 is also formed between the step portion 22c and the end surface of the protrusion portion 33d of the stator 33, namely, on a radially outer side of the protrusion portion 22b of the spool 22 that has advanced rightward from the through-hole 33a of the stator 33 in the axial direction. Therefore, the volume of the first space S1 increases (refer to FIG. 3). Incidentally, in FIG. 3, the volume of the first space S1 is maximized.

As illustrated in FIG. 5, an annular groove 33f that is recessed radially inward along the axially right end surface of the base portion 33c is formed in the outer peripheral surface of the protrusion portion 33d of the stator 33 over the circumferential direction. In addition, in the outer peripheral surface of the protrusion portion 33d of the stator 33, an axial groove 33g extending from the annular groove 33f to a substantially center portion of the protrusion portion 33d in the axial direction is formed, and an axial groove 33h extending from the annular groove 33f to the end surface of the protrusion portion 33d in the axial direction is formed at a part in the circumferential direction, namely, at a portion having a predetermined width in the circumferential direction at a position where the axial groove 33h faces the axial groove 33g in the radial direction, namely, in a phase that is 180 degrees opposite to a radial center of the annular groove 33f. Incidentally, the annular groove 33f, the axial groove 33g, and the axial groove 33h are formed to have substantially the same depth in the radial direction and to have substantially the same groove width.

Figure 6:
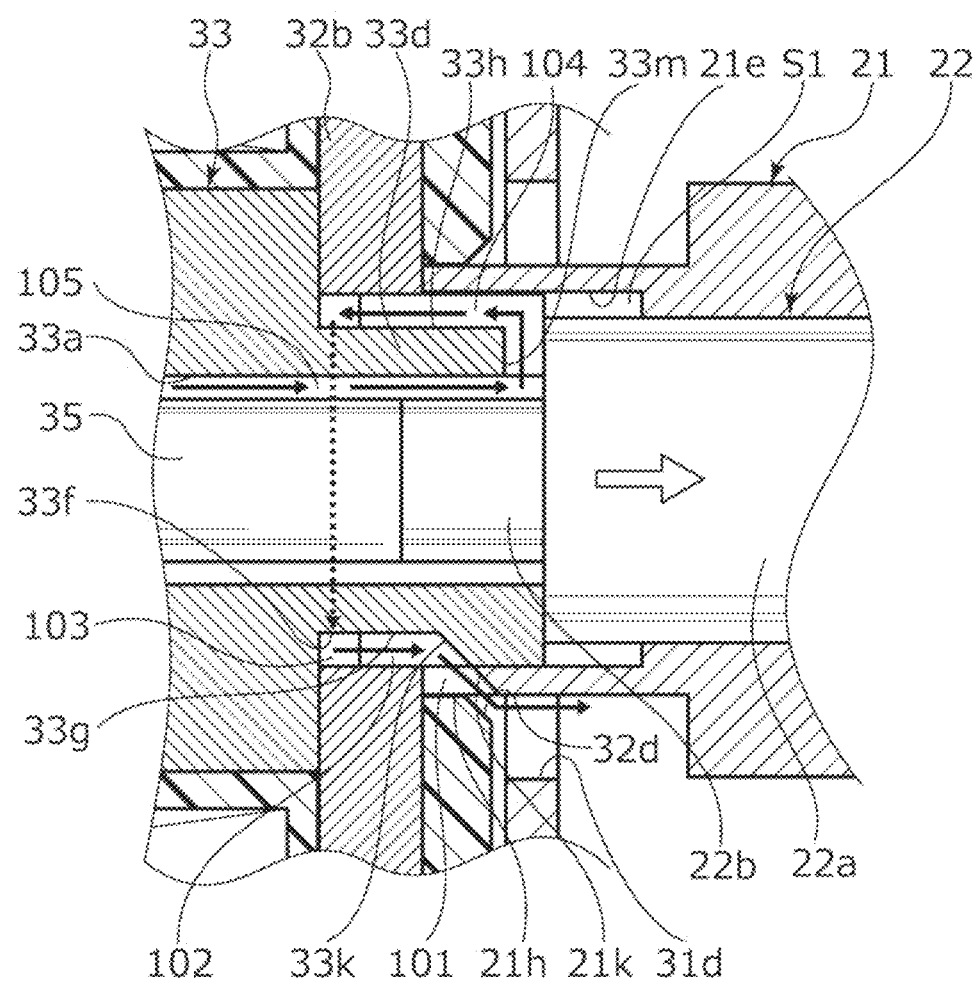
FIG. 6 is an enlarged cross-sectional view illustrating the flow of a fluid in a breathing passage when the solenoid valve is switched from an off state to an on state in the embodiment. Incidentally.
Figure 7:
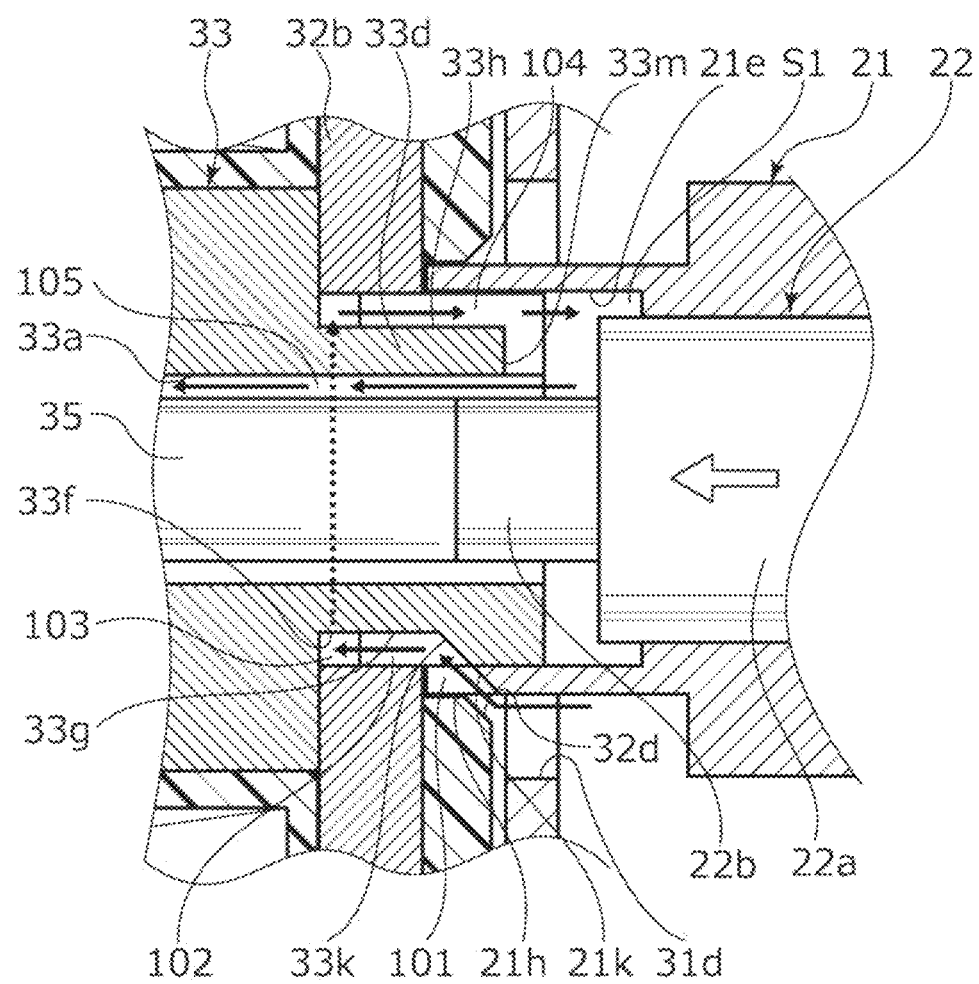
FIG. 7 is an enlarged cross-sectional view illustrating the flow of the fluid in the breathing passage when the solenoid valve is switched from an on state to an off state in the embodiment. Incidentally.

In addition, in a state where the valve unit 2 is attached to the solenoid unit 3, the axial groove 33g is disposed on a vertically lower side and the axial groove 33h is disposed on a vertically upper side (refer to FIGS. 6 and 7). Incidentally, the axial groove 33g has a tapered surface 33k that is inclined leftward from the radially outer side toward the radially inner side in the axial direction, and is disposed to be continuous with the tapered surface 21k of the cutout 21h from the radially outer side to the radially inner side in a state where the valve unit 2 is attached to the solenoid unit 3, the cutout 21h being formed in the sleeve 21.

In addition, a radial groove 33m extending radially inward from the axial groove 33h is formed in the end surface of the protrusion portion 33d of the stator 33.

Next, a breathing passage that allows communication between the second space S2 in the accommodation space 30 and the outside of the solenoid valve 1 will be described. Incidentally, since breathing between the third space S3 in the accommodation space 30 and the outside of the solenoid valve 1 is independently performed via a gap formed between the second tubular body 37 and the end plate 39 and via the cutout 31c of the solenoid casing 31, a detailed description will be omitted.

As illustrated in FIGS. 6 and 7, on an outer periphery of the protrusion portion 33d of the stator 33, an axial communication passage 102 extending in the axial direction is formed by the axial groove 33g and an inner peripheral surface of the lower plate 32b, a first breathing flow passage 103 having an annular shape and extending in the circumferential direction is formed by the annular groove 33f and the inner peripheral surface of the lower plate 32b, and a second breathing flow passage 104 extending in the axial direction is formed by the axial groove 33h and the inner peripheral surfaces of the lower plate 32b and of the recessed portion 21e of the sleeve 21.

An axially left end of the axial communication passage 102 communicates with the first breathing flow passage 103 in the axial direction, and an axially right end portion of the axial communication passage 102 communicates with a breathing hole 101 in the radial direction, the breathing hole 101 being formed by the cutout 21h of the sleeve 21 and an axially right end surface of the lower plate 32b. Incidentally, the breathing hole 101 communicates with the outside of the solenoid valve 1 via the opening 31d of the solenoid casing 31. In addition, a flow passage that is inclined radially outward toward the opening 31d of the solenoid casing 31 is formed in the breathing hole 101 by the tapered surface 21k of the cutout 21h of the sleeve 21 and chamfering of an opening 32d of the solenoid molded body 32 that faces the tapered surface 21k in the radial direction, and the fluid easily flows in and out between the breathing hole 101 and the opening 32d of the solenoid molded body 32.

An axially left end of the second breathing flow passage 104 communicates with the first breathing flow passage 103 in the axial direction, and an axially right end of the second breathing flow passage 104 communicates with the first space S1 in the axial direction. In addition, an axially right end portion of the second breathing flow passage 104 communicates with a third breathing flow passage 105 formed by an inner peripheral surface of the through-hole 33a of the stator 33 and outer peripheral surfaces of the protrusion portion 22b of the spool 22 and of the rod 35, in the radial direction through the radial groove 33m extending radially inward in the end surface of the protrusion portion 33d of the stator 33.

An axially left end of the third breathing flow passage 105 communicates with the second space S2 (refer to FIGS. 2 and 3), and an axially right end of the third breathing flow passage 105 is capable of directly communicating with the first space S1 according to the axial position of the spool 22.

As described above, in the present embodiment, the breathing passage that allows communication between the second space S2 in the accommodation space 30 and the outside of the solenoid valve 1 includes the opening 31d of the solenoid casing 31, the breathing hole 101, the axial communication passage 102, the first breathing flow passage 103, the second breathing flow passage 104, the first space S1, the radial groove 33m, and the third breathing flow passage 105 in order from the outside of the solenoid valve 1.

Next, the flow of the fluid in the breathing passage involved by operation of the solenoid valve 1 will be described. As illustrated in FIG. 6, when the coil 32a is energized to switch the solenoid valve 1 from an off state to an on state and thus to move the plunger 34 rightward toward the stator 33 in the axial direction, the fluid existing in the second space S2 passes through the third breathing flow passage 105, through the radial groove 33m, through the second breathing flow passage 104, through the first breathing flow passage 103, through the axial communication passage 102, and through the breathing hole 101 in order from the inside of the solenoid valve 1, and is discharged to the outside of the solenoid valve 1 (refer to solid line arrows in FIG. 6).

Incidentally, FIG. 6 illustrates a state immediately after the energization of the coil 32a, namely, an initial movement state of the plunger 34, and the fluid that has moved rightward in the axial direction to be pushed out from the second space S2 through the third breathing flow passage 105 collides with the axially left end surface of the land portion 22a of the spool 22, flows into the second breathing flow passage 104 via the radial groove 33m, and moves through the second breathing flow passage 104 leftward in the axial direction, to generate a force to push out the fluid in the first breathing flow passage 103 to the outside from the axial communication passage 102 and from the breathing hole 101 that are disposed on a vertically lower side.

Figure 8A:
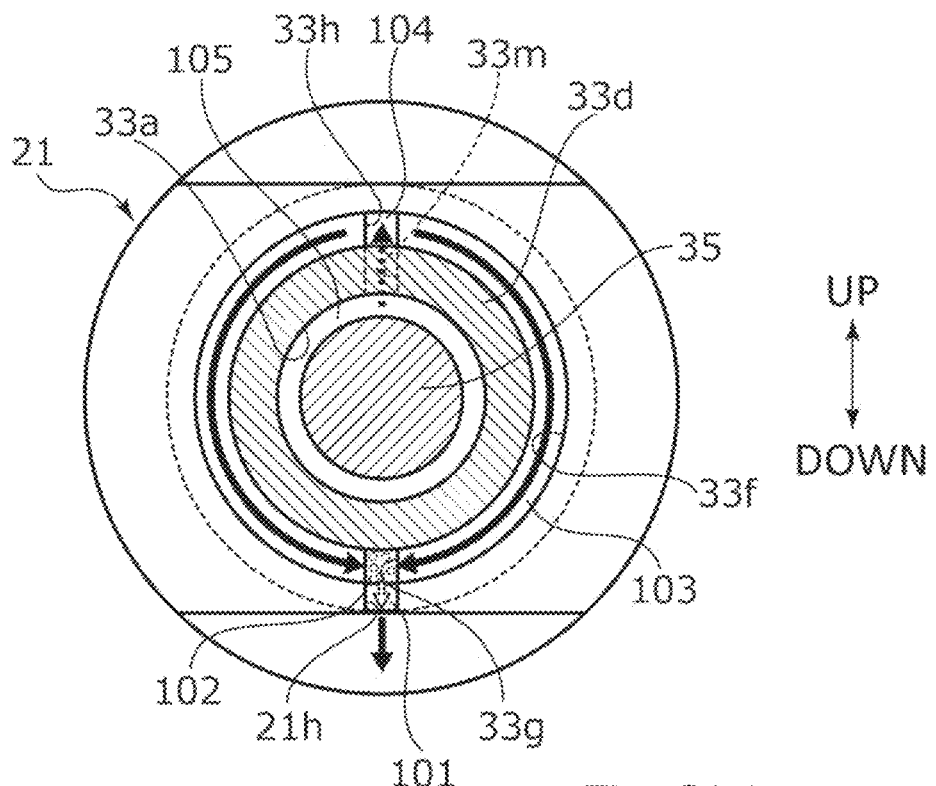
FIG. 8A is a cross-sectional view illustrating the flow of the fluid in the breathing passage when the solenoid valve is switched from an off state to an on state taken along line B-B of FIG. 2.

In addition, as illustrated in FIG. 8A, since the first breathing flow passage 103 is formed in an annular shape, in an off state of the solenoid valve 1, a contamination having heavy specific gravities in the fluid inside the first breathing flow passage 103 is easily collected in the vicinity of the axial communication passage 102 that is formed on the vertically lower side, and is easily discharged to the outside through the axial communication passage 102 and through the breathing hole 101, together with the fluid.

In addition, as illustrated in FIG. 6, on an axially right side of the axial communication passage 102 and of the breathing hole 101, the tapered surface 33k of the axial groove 33g and the tapered surface 21k of the cutout 21h are continuous with each other, and the flow of the fluid is guided from the radially inner side toward the radially outer side, so that it is difficult for a vortex to be generated in the axial communication passage 102 and in the breathing hole 101, and the contamination is easily discharged to the outside, together with the fluid.

Further, since the flow passage that is inclined toward the radially outer side on which the opening 31d of the solenoid casing 31 is formed is formed in the breathing hole 101 by the tapered surface 21k of the cutout 21h of the sleeve 21 and chamfering of the opening 32d of the solenoid molded body 32, the contamination is easily discharged to the outside, together with the fluid.

Incidentally, when the spool 22 is driven rightward in the axial direction by the movement of the plunger 34 and the rod 35, the axially left end surface of the land portion 22a of the spool 22 is separated rightward from the end surface of the protrusion portion 33d of the stator 33 in the axial direction, so that the fluid which has moved through the third breathing flow passage 105 rightward in the axial direction directly flows out into the first space S1. At this time, the radial groove 33m is opened toward the first space S1, and the fluid that has moved rightward in the axial direction to be pushed out from the second space S2 through the third breathing flow passage 105 flows out to the first space S1 which is increased in volume. For this reason, the force from the fluid to push the spool 22 rightward is not large more than necessary.

In addition, since the breathing passage can be made long by the first breathing flow passage 103 having an annular shape and the second breathing flow passage 104 extending in the axial direction, the fluid existing in the breathing passage is prevented from being discharged to the outside of the solenoid valve 1 more than necessary.

On the other hand, as illustrated in FIG. 7, for example, when the energization of the coil 32a is cut off to switch the solenoid valve 1 from an on state to an off state and thus to move the plunger 34 leftward in the axial direction, the fluid existing outside the solenoid valve 1 passes through the breathing hole 101, through the axial communication passage 102, through the first breathing flow passage 103, through the second breathing flow passage 104, through the radial groove 33m, through the first space S1, and through the third breathing flow passage 105 in order from the outside of the solenoid valve 1, and is supplied to the second space S2 (refer to solid line arrows in FIG. 7).

Incidentally, FIG. 7 illustrates a state immediately after the energization of the coil 32a is cut off, namely, an initial movement state of the plunger 34, and the fluid that has flowed into the first breathing flow passage 103 from the outside of the solenoid valve 1 through the breathing hole 101 and through the axial communication passage 102 and has moved rightward in the axial direction to be pushed out from the first breathing flow passage 103 through the second breathing flow passage 104 mainly flows out to the first space S1 which is increased in volume, from a position on a radially outer side of the spool 22. For this reason, the flow of the fluid is weakened by the dispersion of the fluid in the first space S1 without directly collision with the spool 22, so that the influence of the fluid in the radial direction is decreased. Therefore, the spool 22 can be held coaxially with the sleeve 21 without being inclined, smooth slidability of the spool 22 with respect to the sleeve 21 can be maintained, and responsiveness of the solenoid valve 1 can be improved.

Figure 8B:
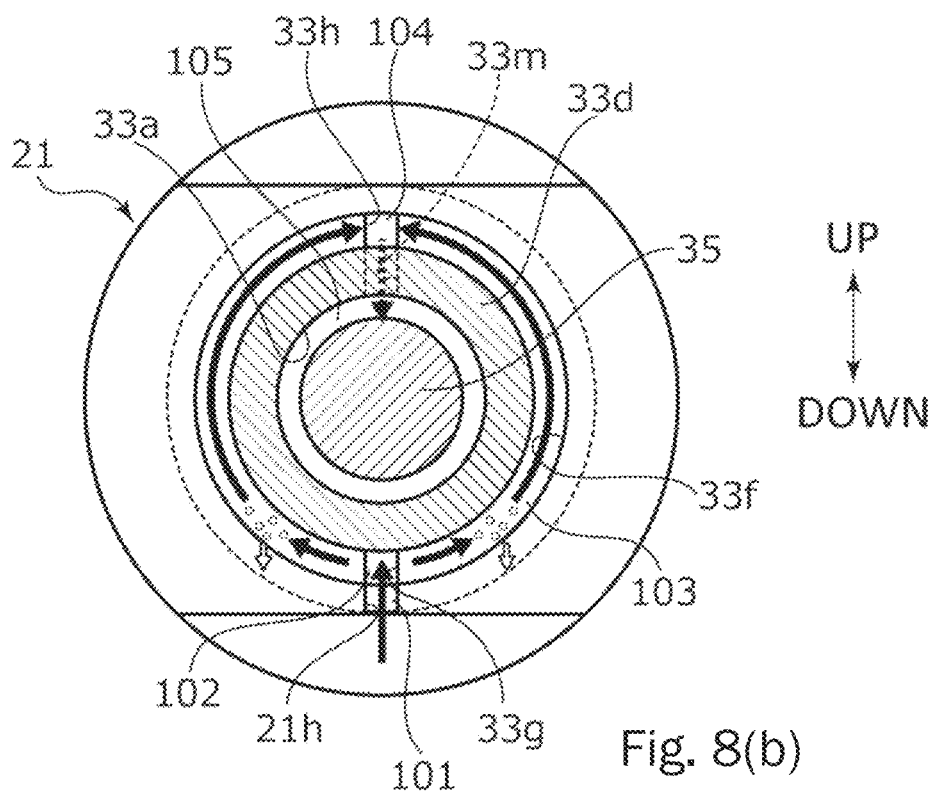
FIG. 8B is a cross-sectional view illustrating the flow of the fluid in the breathing passage when the solenoid valve is switched from an on state to an off state taken along line B-B of FIG. 3.

In addition, as illustrated in FIG. 8B, the first breathing flow passage 103 is formed in an annular shape, and even when the contamination existing in the fluid outside the solenoid valve 1 infiltrate into the first breathing flow passage 103 through the breathing hole 101 and through the axial communication passage 102 that are formed on the vertically lower side, in order to flow into the second breathing flow passage 104 that is disposed on a vertically upper side to face the axial communication passage 102 in the radial direction, the contamination needs to move through the first breathing flow passage 103 approximately 180 degrees in the circumferential direction, together with the fluid. Accordingly, the contamination having heavy specific gravities in the fluid easily descend to a lower side of the first breathing flow passage 103, and it is difficult for the contamination to infiltrate into the second breathing flow passage 104. Incidentally, since the fluid existing in the first space S1 is mainly supplied to the second space S2 through the third breathing flow passage 105, it is also difficult for the contamination to infiltrate into the second space S2.

In addition, since the breathing hole 101 and the axial communication passage 102 are disposed on the vertically lower side, for example, even when the solenoid valve 1 is installed to be half immersed in oil, the fluid existing outside the solenoid valve 1 is easily taken in.

In addition, since the breathing passage can be made long by the first breathing flow passage 103 having an annular shape and the second breathing flow passage 104 extending in the axial direction, it is difficult for the contamination existing outside the solenoid valve 1 to infiltrate into the second space S2.

In addition, as illustrated in FIG. 7, since the second breathing flow passage 104 communicates with the first space S1 on the radially outer side of the spool 22, particularly, immediately after the energization of the coil 32*a* is cut off, namely, in an initial movement state of the plunger 34, the fluid that moves through the second breathing flow passage 104 rightward in the axial direction to flow out into the first space S1 acts mainly on the sleeve 21 on the radially outer side of the spool 22, so that it is difficult for the fluid to affect the operation of the spool 22.

In addition, since the radial groove 33*m* that is opened to the first space S1 to allow communication between the second breathing flow passage 104 and the third breathing flow passage 105 is formed in the end surface of the protrusion portion 33*d* of the stator 33, and regardless of the axial position of the spool 22, the second breathing flow passage 104 and the third breathing flow passage 105 always communicate with each other, the movement of the fluid in the breathing passage is not interfered with, so that resistance of the fluid involved by the movement of the plunger 34 can be reliably reduced.

As described above, the solenoid valve 1 of the present embodiment is capable of not only having damping performance that is stable due to the breathing passage, but also exhibiting high responsiveness and contamination resistance.

In addition, since the axial communication passage 102, the first breathing flow passage 103, and the second breathing flow passage 104 that form the breathing passage are formed by the annular groove 33*f*, the axial groove 33*g*, and the axial groove 33*h* that are provided in an outer peripheral surface of the stator 33, a part of the breathing passage can be easily formed on an outer periphery of the stator 33 by processing each groove in the outer peripheral surface of the stator 33.

The embodiment of the present invention has been described above with reference to the drawings; however, the specific configuration is not limited to the embodiment, and changes or additions that are made without departing from the scope of the present invention are included in the present invention.

For example, in the embodiment, a case has been described in which the first space S1 forming the breathing passage is defined by the axially right end surface of the protrusion portion 33*d* of the stator 33, the inner peripheral surface of and the bottom surface of the recessed portion 21*e* of the sleeve 21, and the outer peripheral surface of the spool 22; however, the present invention is not limited to the case, and the first space S1 may be defined by other members such as the rod as long as the first space S1 is formed on an axial side opposite to the accommodation space formed on the axially left side of the stator, namely, on the axially right side of the stator.

In addition, in the embodiment, a case has been described in which the axial communication passage 102, the first breathing flow passage 103, and the second breathing flow passage 104 that form the breathing passage are formed by the annular groove 33*f*, the axial groove 33*g*, and the axial groove 33*h* that are formed in the outer peripheral surface of the stator 33; however, the present invention is not limited to the case, and for example, grooves may be formed in the inner peripheral surface of the lower plate and in the inner peripheral surface of the recessed portion of the sleeve to form the outer peripheral surface of the protrusion portion of the stator and the breathing passage.

In addition, in the embodiment, a case has been described in which the first breathing flow passage 103 is formed in an annular shape; however, the present invention is not limited to the case, and the first breathing flow passage may be formed in a shape with an end as long as the first breathing flow passage extends on the outer periphery of the stator in the circumferential direction.

In addition, in the embodiment, a case has been described in which the first breathing flow passage 103 communicates with the outside of the solenoid valve 1 via the axial communication passage 102 extending toward the opening 31*d* of the solenoid casing 31 in the axial direction; however, the present invention is not limited to the case, and without the axial communication passage being provided, the first breathing flow passage may communicate with the outside via the breathing hole and via the opening of the solenoid casing.

In addition, in the embodiment, a case has been described in which the breathing hole 101 is formed by the cutout 21*h* of the sleeve 21 and the axially right end surface of the lower plate 32*b*; however, the present invention is not limited to the case, and for example, the breathing hole may be formed by a through-hole penetrating through the sleeve in the radial direction.

In addition, in the embodiment, a case has been described in which the second breathing flow passage 104 communicates with the first space S1 on a radially outer side of the land portion 22*a* of the spool 22; however, the present invention is not limited to the case, and the axially right end of the second breathing flow passage may be formed to face the axially left end surface of the land portion of the spool in the axial direction.

In addition, in the embodiment, a case has been described in which the second breathing flow passage 104 faces the axial communication passage 102 in the radial direction; however, the present invention is not limited to the case, and for example, the second breathing flow passage and the axial communication passage may be formed with a phase shift of 90 degree in the circumferential direction. Incidentally, from the viewpoint of contamination resistance, it is preferable that the second breathing flow passage and the axial communication passage are shifted in phase by 90 degrees or more in the circumferential direction.

In addition, the axial communication passage 102 may not be formed on the vertically lower side on the outer periphery of the stator 33. Incidentally, from the viewpoint of contamination resistance, fluid intake, or the like, it is preferable that the axial communication passage is formed to communicate with the lower side of the first breathing flow passage.

In addition, in the embodiment, a case has been described in which the radial groove 33*m* is formed in the end surface of the protrusion portion 33*d* of the stator 33; however, the present invention is not limited to the case, and the radial groove may be formed in an end surface of the land portion of the spool that faces the end surface of the protrusion portion 33*d* of the stator 33 in the axial direction. In addition, the radial groove may not be formed in the stator or in the spool.

In addition, in the embodiment, a case has been described in which the breathing hole 101 forming the breathing passage is formed on an axially left side of the opening 31*d* of the solenoid casing 31, namely, inside the solenoid casing 31; however, the present invention is not limited to the case, and the breathing hole may be formed in an outer portion of the solenoid casing, or the fluid may directly flow into and out from the breathing passage via a breathing hole that is an opening formed in the sleeve.

In addition, in the embodiment, a case has been described in which the rod 35 is formed separately from the spool 22; however, the present invention is not limited to the case, and the rod and the spool may be integrally formed.

REFERENCE SIGNS LIST

1 Solenoid valve
2 Valve unit
3 Solenoid unit
21 Sleeve
21a Through-hole
21e Recessed portion
21h Cutout (opening)
21k Tapered surface
22 Spool
22a Land portion
22b Protrusion portion
30 Accommodation space
31 Solenoid casing
31d Opening
32 Solenoid molded body
32b Lower plate
33 Stator
33a Through-hole
33b Recessed portion
33c Base portion
33d Protrusion portion
33e Step portion
33f Annular groove
33g Axial groove
33h Axial groove
33k Tapered surface
33m Radial groove
34 Plunger
35 Rod
35a Flange portion
36 First tubular body
37 Second tubular body
38 Third tubular body
39 End plate
101 Breathing hole
102 Axial communication passage
103 First breathing flow passage
104 Second breathing flow passage
105 Third breathing flow passage
S1 First space
S2 Second space (accommodation space)
S3 Third space (accommodation space)

The invention claimed is:

1. A solenoid valve comprising:
a valve unit including a sleeve in which a spool is accommodated so as to be movable in an axial direction; and
a solenoid unit including a plunger to be brought into contact with and separated from a stator by an electromagnetic force to drive the spool in the axial direction, a solenoid molded body disposed on an outer periphery of the plunger and of the stator, and a solenoid casing that accommodates the solenoid molded body,
wherein the plunger is disposed in an accommodation space of which at least a part is defined by the stator inside the solenoid unit, and
the solenoid valve further comprises a first breathing flow passage extending at least in a circumferential direction on the outer periphery of the stator to communicate with an outside of the solenoid valve,
a second breathing flow passage extending in the axial direction from part of the first breathing flow passage in the circumferential direction to communicate with a first space defined by the stator, the sleeve, and the spool,
a third breathing flow passage extending in the axial direction on an inner periphery of the stator to allow communication between the first space and the accommodation space,
wherein the first breathing flow passage is formed in an annular shape, and communicates with the outside of the solenoid valve through an axial communication passage extending in the axial direction toward an opening formed in the solenoid casing or in the sleeve, and
the axial communication passage is formed on a vertically lower side on the outer periphery of the stator in case the plunger is moved in a horizontal direction.

2. The solenoid valve according to claim 1, wherein the second breathing flow passage communicates with the first space on a radially outer side with respect to the spool.

3. The solenoid valve according to claim 1, wherein the second breathing flow passage faces the axial communication passage in a radial direction.

4. The solenoid valve according to claim 1, wherein a radial groove communicating with the second breathing flow passage and with the third breathing flow passage is formed in the stator or in the spool.

5. The solenoid valve according to claim 2, wherein the second breathing flow passage faces the axial communication passage in a radial direction.

6. The solenoid valve according to claim 2, wherein a radial groove communicating with the second breathing flow passage and with the third breathing flow passage is formed in the stator or in the spool.

7. The solenoid valve according to claim 3, wherein a radial groove communicating with the second breathing flow passage and with the third breathing flow passage is formed in the stator or in the spool.

* * * * *